(No Model.)

2 Sheets—Sheet 1.

H. P. HEACOCK.
SAW MILL FEED WORKS.

No. 404,002. Patented May 28, 1889.

Witnesses.
W. Rosster
P. H. T. Mason

Inventor
Howard P. Heacock
By Raymond & Veeder
Att'ys.

(No Model.) 2 Sheets—Sheet 2.

H. P. HEACOCK.
SAW MILL FEED WORKS.

No. 404,002. Patented May 28, 1889.

Witnesses
W. Rossiter
P. H. T. Mason.

Inventor
Howard P. Heacock
By Raymond & Veeder
Att'ys

United States Patent Office.

HOWARD P. HEACOCK, OF MISSOULA, MONTANA TERRITORY.

SAW-MILL FEED-WORKS.

SPECIFICATION forming part of Letters Patent No. 404,002, dated May 28, 1889.

Application filed January 21, 1889. Serial No. 296,957. (No model.)

*To all whom it may concern:*

Be it known that I, HOWARD P. HEACOCK, of Missoula, in the county of Missoula, in the Territory of Montana, have invented certain new and useful Improvements in Saw-Mill Feed-Works, of which the following is a specification.

My invention relates to feed-works for saw-mills in which the traverse of the log-carriage is effected by belts adapted to drive the carriage either to or from the saw as one or another is brought into action. An apparatus of a similar kind has been heretofore patented to me by Letters Patent of the United States No. 395,051, dated December 25, 1888.

The main object of my invention is to simplify the construction of the feed-works by reducing the belts to the least possible number, thereby increasing the efficiency of the machine while diminishing the cost of repairs.

Another object is to make the machine more compact and less in the way.

Figure 1:
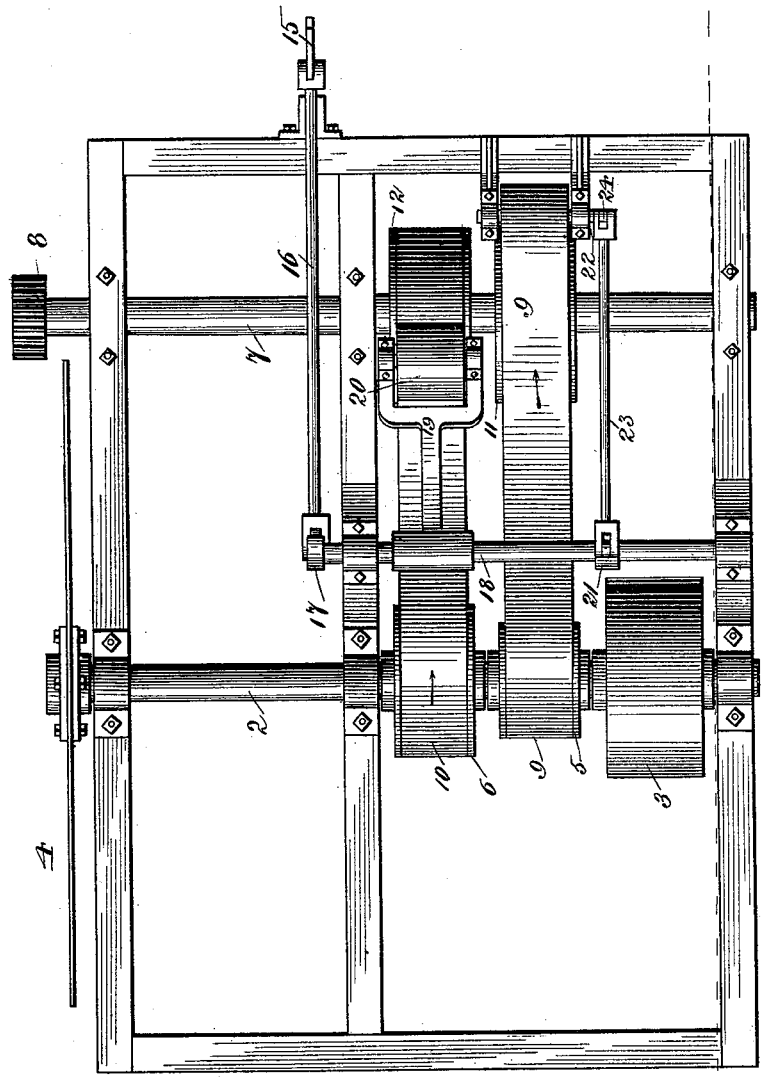
Figure 2:
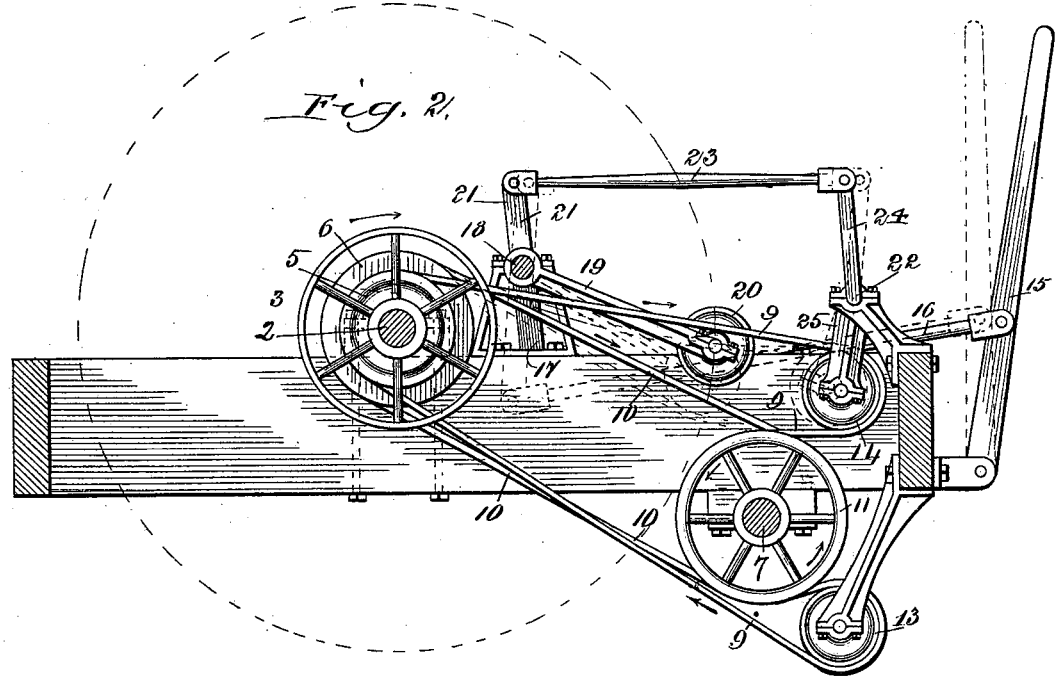
Figure 3:
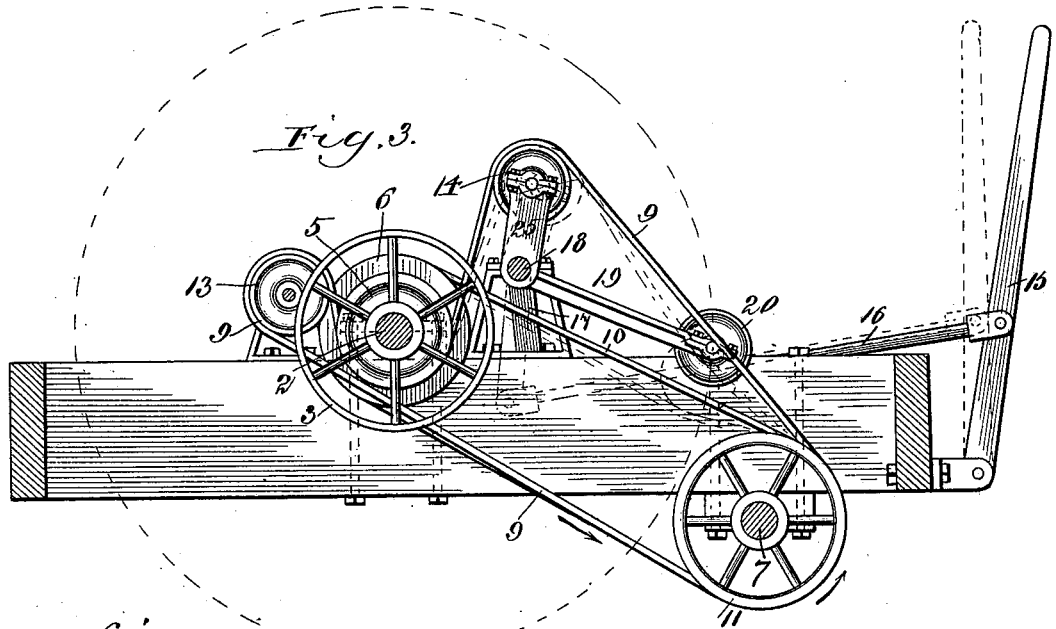

In the accompanying drawings, Figure 1 is a plan view showing the saw and its arbor and so much of the feed-works as is necessary to illustrate my invention. The carriage is omitted because its construction has nothing to do with the construction or operation of my present invention. Fig. 2 is a side view, mostly in elevation, a side timber of the frame being removed, as indicated by the dotted line *x x*, Fig. 1. Fig. 3 is also a side view, and shows a modification operating in essentially the same manner as the device shown in the preceding views.

2, Fig. 1, is the saw-arbor. 3 is the driving-pulley, and 4 the saw. Upon the saw-arbor are pulleys 5 and 6, preferably flanged.

7 is a shaft of the feed-works, which drives the log-carriages through a pinion, 8, or its equivalent. Said shaft 7 is driven by belts 9 10, passing from pulleys 5 and 6 on the saw-arbor to pulleys 11 and 12 on the shaft 7. The belts 9 and 10 are loose on the pulleys and only communicate motion to the shaft 7 when they are acted upon by their tightener-pulleys.

The construction and operation of the tightener and the mode of passing the belts around their respective pulleys may best be seen in Figs. 2 and 3. Taking Fig. 2 first, it will be seen that there is an idler-pulley, 13 14, on each side of the pulley 11, and that the belt 9, instead of passing direct to pulley 11 on the feed-shaft, passes first round one of the idlers, then round pulley 11, and thence to the second idler, and so back to the driving-pulley 5. The belt 9 thus has one face, which may be called its "inner" face, in contact with pulley 5, and its other or outer face in contact with the pulley 11, which causes the pulley 11 to rotate in the opposite direction from its driver 5, as indicated by the arrows. The belt 10, on the other hand, passes direct from pulley 6 to pulley 12, and hence has its inner face in contact with both, and both rotate in the same direction when driven by said belt. The belts 5 and 6, as before stated, are loose, and to make either one effective, and thereby rotate the feed-shaft in one direction or the other, so as to feed the log-carriage to or from the saw, a tightener is provided which is so constructed as to act alternately on either belt. As shown in Figs. 1 and 2, said tightener consists of a lever, 15, located in easy reach of the sawyer, to which a connecting-rod, 16, joins an arm, 17, of the rock-shaft 18. A second arm, 19, on shaft 18 carries the tightener-pulley 20, which acts upon the belt 10, and a third arm, 21, on the same shaft operates the rock-shaft 22 through the connecting-rod 23 and arm 24. The rock-shaft 22 supports the idler-pulley 14 upon the arm 25, said idler-pulley thus serving both as an idler to lead the belt 9 in contact with the pulley 11 and also as a tightener. With the tightener in the position shown in full lines in Fig. 2 the belt 9 is tight and the carriage is fed toward the saw. When shifted to the position shown in dotted lines, the belt 10 will be tightened, the belt 9 loosened, and the carriage will have its motion reversed. In an intermediate position both belts will be loose and the carriage still.

In Fig. 2 the belt 9 is shown as having its inner face in contact with pulley 5 and its outer with pulley 11. In Fig. 3 this is reversed, the outer face being in contact with pulley 5. This change is accompanied by a change in the position of the idler-pulleys and in the construction of the tightener. Both of the arms carrying the tightener-pulleys are in this construction on the same shaft, 18; but the mode of operation is unchanged.

Other modifications might be described; but the above will show the essential features of novelty in the feed-works, consisting, in brief, of the two belts 9 and 10, driven from the saw-arbor, one belt having its opposite sides in contact with its driving and driven pulleys and the other having the same side in contact with its driving and driven pulleys, and a tightener to act alternately upon said belts.

I claim—

1. The combination, in a saw-mill, of two belts driven from the saw-arbor and running over pulleys on a shaft of the feed-works, one of said belts having the same side in contact with both pulleys over which it runs, and the other belt having its opposite sides in contact with its respective pulleys, and a tightener adapted to operate alternately on said belts, substantially as described.

2. The combination of a pulley on the saw-arbor, a pulley on the feed-shaft, a belt running from one pulley to the other, a tightener-pulley acting on said belt, a second pulley on the saw-arbor and upon the feed-shaft, idler-pulleys on each side of one of the two pulleys last named, one of said idlers being movable and acting as a tightener, a belt passing over said idlers, and the pulleys on the saw-arbor and the feed-shaft, as described, and mechanism connecting the movable idler with the first-named tightener-pulley and adapted to cause them to alternately tighten their respective belts, substantially as described.

3. The combination of pulleys 6 and 12 and belt 10, pulleys 5 and 11, idlers 13 and 14, and belt 9, said belts being combined with a tightener consisting of lever 15, rod 16, arm 17, rock-shaft 18, arm 19, and pulley 20, arm 21, rod 23, arm 24, rock-shaft 22, and arm 25, carrying the idler 14, substantially as described.

HOWARD P. HEACOCK.

Witnesses:
J. I. VEEDER,
P. H. T. MASON.